July 13, 1937. E. NEWNHAM 2,086,817
FOOD MIXER AND FRUIT JUICER
Filed May 27, 1935 3 Sheets-Sheet 1
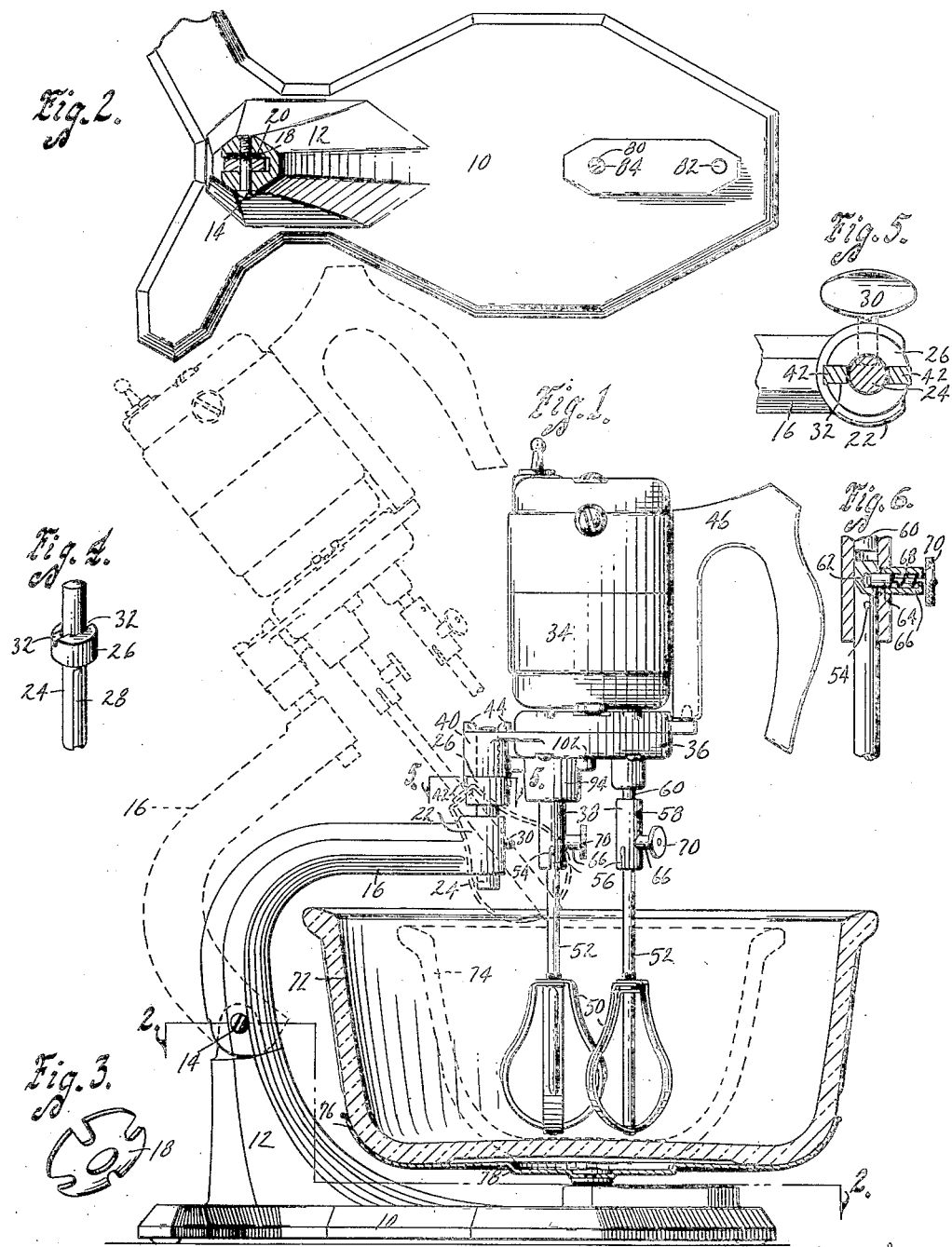

July 13, 1937. E. NEWNHAM 2,086,817
FOOD MIXER AND FRUIT JUICER
Filed May 27, 1935 3 Sheets-Sheet 2
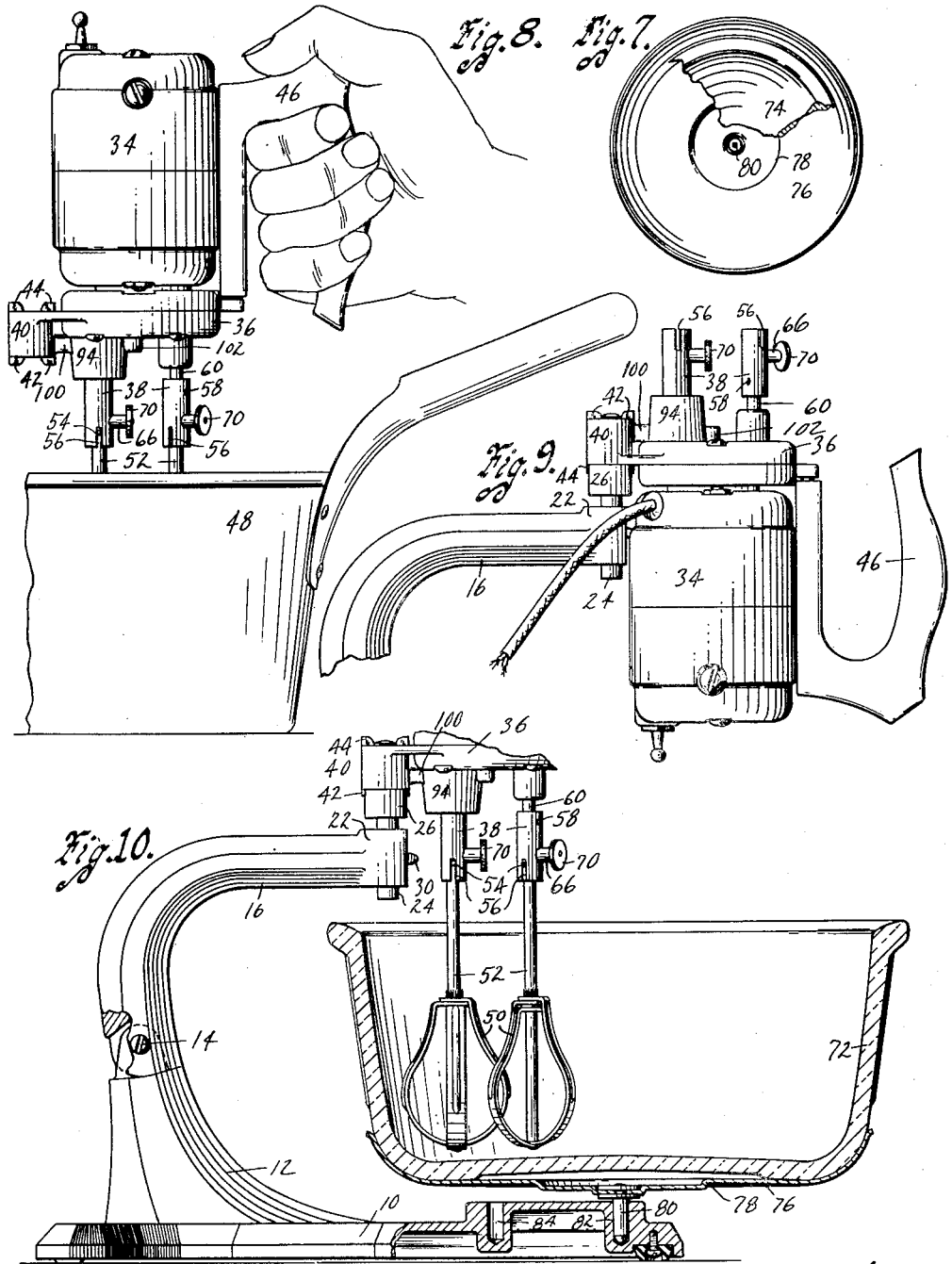
Inventor
Eugene Newnham
By Bair, Freeman & Sinclair
Attorneys
Witness
H. S. Wengenmaier

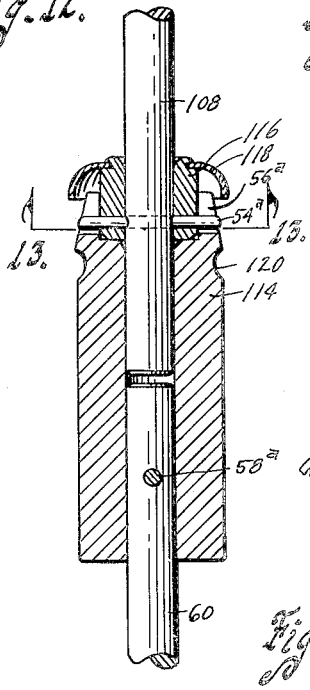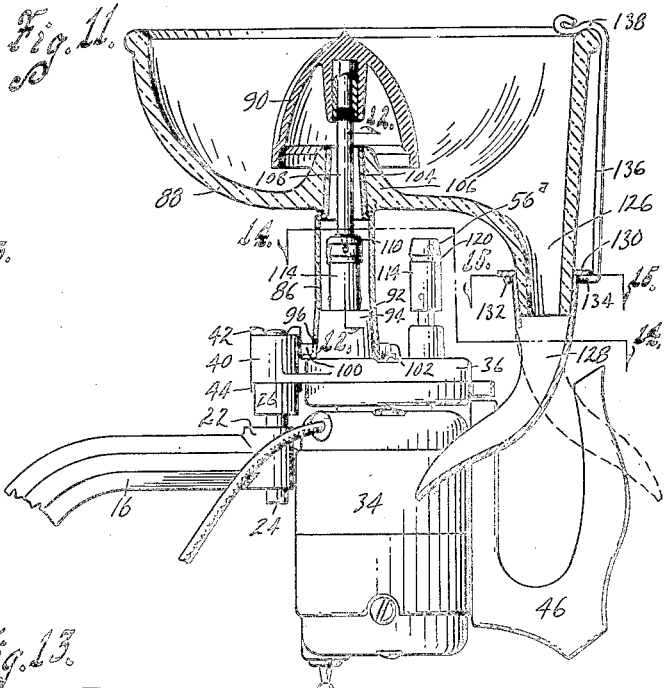

Patented July 13, 1937

2,086,817

UNITED STATES PATENT OFFICE 2,086,817

FOOD MIXER AND FRUIT JUICER

Eugene Newnham, St. Louis, Mo., assignor to Knapp-Monarch Company, St. Louis, Mo., a corporation of Missouri Application May 27, 1935, Serial No. 23,680

5 Claims. (Cl. 259—84)

The object of my invention is to provide a food mixer and fruit juicer, which is simple, durable and comparatively inexpensive to manufacture.

A further object is to provide a simple electric appliance adapted for food mixing and fruit juicing operations, and consisting of a motor removably supported on a base and adapted for either food mixer elements to depend therefrom or a fruit juicer mechanism to be mounted on top thereof, as desired.

A further object is to provide a food mixer consisting of a base having a pedestal, an arm pivoted to the pedestal, a motor carried by the arm, and mixing elements depending from the motor and located within a bowl supported on the base, the pivotal connection of the arm being such that during movement of the mixing elements upwardly and downwardly in the bowl, they will remain substantially the same distance from one edge of the bowl.

A further object is to provide a friction washer connection in the pivot of the arm, so that the arm will stay in the raised position when desired, the frictional means being concealed with a bifurcation of the pedestal and arm connection.

Still another object is to provide a pin and socket connection between the motor and the arm, means being provided to prevent swinging of the motor relative to the arm, and the pin being vertically adjustable to position the mixing elements when in their lower position with respect to the bottom of the mixing bowl, as desired.

Still another object is to provide novel clutch connections between the mixing elements and the motor, these connections being readily disconnectible and similar connections being provided for the juicer mechanism.

Still another object is to provide a simple and readily operable connection for a spout extension removably positioned on a spout, which is provided on the juicer bowl, for the purpose of permitting the juice to flow therefrom.

With these and other objects in view, my invention consists in the construction, arrangement and combination of the various parts of my food mixer and fruit juicer, whereby the objects contemplated are attained, as hereinafter more fully set forth, pointed out in my claims, and illustrated in the accompanying drawings, in which:

Figure 1 is a side elevation of a food mixer and fruit juicer embodying my invention, showing it adjusted for food mixing, and showing a large bowl in section and a small one dotted, a dotted position of the mixing mechanism also being shown, illustrating it in the raised position, as when removing the bowl from the bowl support of the mixer.

Figure 2 is a sectional view on the line 2—2 of Figure 1, showing the base of the mixer and details of the pivotal connection and mounting for the mixing bowl support.

Figure 3 is a perspective view of a friction washer forming a part of the pivotal connection for the motor supporting arm.

Figure 4 is a perspective view of a pin associated with a motor supporting arm and with the motor of the food mixer.

Figure 5 is an enlarged, sectional view on the line 5—5 of Figure 1.

Figure 6 is an enlarged, vertical, central, sectional view of the lower end of a shaft projecting from the motor and the shank of a food mixer element, showing them connected with each other.

Figure 7 is a plan view of the bowl support of my food mixer and fruit juice extractor, showing a portion of the small bowl associated therewith.

Figure 8 is a side elevation showing the motor and mixer elements being supported by hand, independent of the base of the food mixer.

Figure 9 is a side elevation showing the motor inverted for using the fruit juicer mechanism or other tool, which can be provided and associated with the mixer element shafts if desired.

Figure 10 is a partial side elevation, partly in section, showing the cooperation of the mixing elements with a large bowl when supported on the base.

Figure 11 is a side elevation showing the fruit juicer mechanism connected with the motor, the greater part of the fruit juicer mechanism being shown in section.

Figure 12 is an enlarged, vertical, sectional view on the line 12—12 of Figure 11, showing a clutch connection between a fruit juice reamer and a shaft for driving it.

Figure 13 is a sectional view on the line 13—13 of Figure 12.

Figure 14 is a sectional view on the line 14—14 of Figure 11, showing the cooperation of a pedestal for the fruit juicer mechanism with the motor.

Figure 15 is a sectional view on the line 15—15 of Figure 11, showing the cooperation of the retaining element for an extension spout of the juicer mechanism.

Figure 16 is a perspective view of the juicer mechanism supporting pedestal.

Figure 17 is a partial side elevation, showing a modified mixing element, and illustrating the details of a clutch connection between it and the motor shaft.

Figure 18 is a perspective view of part of the clutch mechanism shown in Figure 17.

On the accompanying drawings, I have used the reference numeral 10 to indicate a base. A pedestal 12 projects upwardly therefrom. Pivoted on a screw or the like 14 is the bifurcated end of a motor supporting arm 16. A friction washer formed of spring material is mounted within a recess 20 (see Figure 2) of the bifurcation of the arm 16 and thus concealed from view. The washer 18 is originally formed considerably cup-shaped, and then somewhat flattened within the recess 20, to provide the desired friction to keep the arm 16 in the dotted position of Figure 1, when the upper parts of the mixer are moved to different positions.

The free end of the arm 16 is provided with a hub 22. Vertically slidably in the hub 22 is a pin 24, having a collar 26. The pin 24 has a keyway 28 (see Figure 4), with which a wing set screw 30 is cooperable to retain the pin at any desired elevation relative to the hub 22. The collar 26 is provided with a transverse slot, as indicated at 32 for a purpose which will hereinafter appear.

I provide a motor 34 mounted on a suitable gear casing 36 within which gearing (not shown) connects the motor shaft with a pair of clutch elements 38. A boss 40 is formed on the housing 36 and is perforated to receive the upper end of the pin 24. The boss 40 is provided on one end with lugs 42 and on the other end with lugs 44 to enter the slot 32 of the collar 26 when the motor is in the positions of Figures 1 and 9 respectively.

The set screw 30 entering the keyway 28 insures that the slot 32 will assume a certain position relative to the arm 16, so that when the lugs 42 or 44 coact therewith, the gear housing 36 and the motor 34 will project in a desired direction from the hub 22.

The motor 34 is provided with a handle 46. This handle permits manual support of the mixer as shown in Figure 8 when desired, in which figure, the food mixer is shown cooperating with the contents of a pan 48 when on the stove.

Mixer elements comprising loops 50, having overlapping paths of travel are provided with shanks 52 depending from the clutch elements 38. The shanks 52 are provided with pins 54 entering slots 56 of the sleeves 38 to cause rotation of the shanks 52 when the sleeves rotate. The sleeves in turn are pinned as at 58 to shafts 60, which are connected by the gearing within the casing 36 to the shaft of the motor 34.

The shafts 52 are provided with depressions 62 with which retractible pins 64 are adapted to cooperate (see Figure 6). Sleeves 66 are secured to the sleeves 38 and slidably carry the pins 64. Springs 68 tend to project the pins 64 into the depressions 62, and knobs 70 are provided for retracting the pins manually when desired to disconnect the mixer elements from the clutch elements 38.

The mixer elements 50 are adapted to depend within either a large mixing bowl 72 or a small one 74 as desired.

Either of the bowls 72 or 74 are adapted to be supported on a pan-like bowl support 76, having an outer flange to position the large bowl 72 and an inner offset flange 78 to position the small bowl.

The support 76 is secured at its center to a pin 80 adapted to enter either of the sockets 82 or 84 formed in the base 10. When the pin is in the socket 82, the mixer elements cooperate with the contents of the large bowl adjacent its periphery, while when in the socket 84 they cooperate with the central part of the contents of either the large or small bowl, depending on which one is mounted on the bowl support.

My juicer mechanism comprises in general a pedestal 86, a juicer bowl 88 and a fruit reamer 90 for citrus fruit. The pedestal 86 is provided with a tapered sleeve-like portion 92 adapted to snugly fit a hub 94 formed on the gear casing 36, as shown in Figure 11. It is provided with notches indicated at 96 and 98 to clear respectively a rib 100 and a boss 102 on the gear casing.

Its upper end is provided with a tapered sleeve 104 adapted to receive a hub 106 of the juicer bowl 88.

A fruit reamer 90 has depending therefrom a reamer shaft 108. Its lower end is provided with a transverse pin 54a adapted to enter a slot 56a in a clutch sleeve 114 secured as by a pin 58a to the end of one of the shafts 60. The pin 54a holds in position on the shaft 108 a collar 116. A sheet metal cap 118 is carried by the collar 116 to serve as a protector against any juice accidentally getting into the connecting parts between the clutch sleeve 114 and the reamer shaft 108.

The sleeve 114 is provided with an annular groove 120. The cap 118 has a pair of arms 122 having at their ends convex projections 124 adapted to snap into the annular groove 120.

The clutch shown in Figure 12 and consisting of the elements 114 to 124 inclusive is a modified construction of the one shown in Figure 6. Parts in the clutch of Figure 12 similar to those in the clutch of Figure 6 are given the same reference numeral with the addition of the distinguishing character "a".

In Figure 17, I show the mixer element 50 and its shaft 52 provided with a clutch similar to the kind shown in Figure 12, so that the mixer element or the reamer are interchangeably connectible with the motor 34.

The juicer bowl 88 is provided with a depending spout 126, which is received in a tubular portion of a spout extension 128. The tubular portion at its upper end is flanged as indicated at 130 and under this flange, a loop of wire or the like 132 is positioned. The two ends of the loop extending outwardly as at 134 and then upwardly as at 136, and each end terminates in a hook-like part 138 adapted to snap over the upper edge of the bowl 88. Thus the spout extension 128 is readily removable for positioning and storing, and readily replaceable when it is desired to use it. Since its upper end is tubular, it can be rotated as indicated by solid and dotted lines in Figure 11 to cause flow of the juice from the fruit being juiced, either into the mixing bowl when in position on the base or outside of the bowl into some other container, if desired.

Some changes may be made in the construction, and arrangement of the various parts of my food mixer and fruit juicer, without departing from the real spirit and purpose of my invention, and it is my intention to cover by my claims, any modified forms of structure, or use of mechanical equivalents, which may be reasonably included within their scope.

I claim as my invention:

1. In a device of the character disclosed, a base, a mixer bowl supported thereon, a motor support projecting upwardly from said base and overhanging said mixer bowl, an upstanding pin on said motor support, a motor having a perforation to removably receive said pin, coacting lug and notch means to prevent rotation of said motor relative to said pin, and a mixer element depending from said motor, said pin being vertically movable relative to said arm to position said mixer element relative to the bottom of said bowl and means for locking said pin at the desired elevation.

2. In a device of the character described, a base, a motor supporting arm extending upwardly therefrom, a pin projecting upwardly from said supporting arm, a motor, a gear casing on one end thereof, a boss extending from said gear casing and arranged at one side of said motor, a perforation in said boss, either end of which is adapted to receive said pin and coacting lug and notch means on each end of said boss and on said pin to prevent relative rotation thereof when said boss is in position on said pin with either end of the boss down.

3. In a device of the character described, a base, a motor supporting arm extending upwardly therefrom, a pin projecting upwardly from said supporting arm, a motor, a gear casing on one end thereof, a boss extending from said gear casing and arranged at one side of said motor, a perforation in said boss, either end of which is adapted to receive said pin and coacting lug and notch means on said boss and pin to prevent relative rotation thereof, said pin being vertically slidable relative to said motor supporting arm and means retaining it in different positions of elevation.

4. In a device of the character described, a base, a motor supporting arm extending upwardly therefrom, a pin projecting upwardly from said supporting arm, a motor, a gear casing on one end thereof, a boss extending from said gear casing and arranged at one side of said motor, a perforation in said boss, either end of which is adapted to receive said pin, coacting lug and notch means on each end of said boss and on said pin to prevent relative rotation thereof when said boss is in position on said pin with either end of the boss down and means to prevent rotation of said pin relative to said supporting arm.

5. In a device of the character described, a base, a motor supporting arm extending upwardly therefrom, a pin projecting upwardly from said supporting arm, a motor, a gear casing on one end thereof, a boss extending from said gear casing and arranged at one side of said motor, a perforation in said boss, either end of which is adapted to receive said pin and coacting lug and notch means on said boss and pin to prevent relative rotation thereof, said pin being vertically slidable and non-rotatable relative to said motor supporting arm and means retaining it in different positions of elevation.

EUGENE NEWNHAM.